United States Patent
Nakamura et al.

(10) Patent No.: US 10,063,121 B2
(45) Date of Patent: Aug. 28, 2018

(54) ELECTRIC MOTOR CONTROL APPARATUS

(71) Applicants: Takenobu Nakamura, Gifu (JP); Shinichi Togawa, Aichi (JP)

(72) Inventors: Takenobu Nakamura, Gifu (JP); Shinichi Togawa, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 0 days.

(21) Appl. No.: 15/444,859

(22) Filed: Feb. 28, 2017

(65) Prior Publication Data

US 2017/0250589 A1    Aug. 31, 2017

(30) Foreign Application Priority Data

Feb. 29, 2016    (JP) ................................. 2016-036595

(51) Int. Cl.

| | |
|---|---|
| *H02K 5/22* | (2006.01) |
| *H02K 11/00* | (2016.01) |
| *H01R 24/66* | (2011.01) |
| *H02K 5/10* | (2006.01) |
| *H02K 11/33* | (2016.01) |
| *H01R 107/00* | (2006.01) |

(52) U.S. Cl.
CPC ............ *H02K 5/225* (2013.01); *H01R 24/66* (2013.01); *H02K 5/10* (2013.01); *H02K 11/33* (2016.01); *H01R 2107/00* (2013.01)

(58) Field of Classification Search
CPC .......... H02K 11/00–11/40; H02K 5/22; H02K 5/225

USPC .............................. 310/68 B, 68 D, 68 R, 71
See application file for complete search history.

(56) References Cited

U.S. PATENT DOCUMENTS

| | | | |
|---|---|---|---|
| 6,903,473 B2 * | 6/2005 | Matsuyama | ............ G01P 1/026 310/71 |
| 2008/0124970 A1 * | 5/2008 | Yasuda | ................ H01R 13/405 439/527 |
| 2014/0028161 A1 * | 1/2014 | Kamogi | ............... H01R 12/523 310/68 D |

(Continued)

FOREIGN PATENT DOCUMENTS

| | | |
|---|---|---|
| JP | 2013-63689 A | 4/2013 |
| JP | 2013-106376 A | 5/2013 |
| JP | 2014-151850 A | 8/2014 |

(Continued)

*Primary Examiner* — Thomas Truong
(74) *Attorney, Agent, or Firm* — Osha Liang LLP

(57) ABSTRACT

A lid has a fixing surface to be fixed to a metal board so that a metal surface, equipped with no components, of the metal board is in contact with the fixing surface, a through bore provided in laterally close proximity to the fixing surface and exposing mating parts of an external connector with which harnesses are mated, a fixing edge provided around the through bore and fixed to a housing of the external connector; and fixing pedestals projecting from a circumference of the fixing surface and fixed to the control board. A direction of connecting power supply terminals of the external connector to the metal board is a direction being perpendicular to the metal board. A direction of connecting the control board to signal terminals of the external connector is identical to the direction of connecting the power supply terminals to the metal board.

6 Claims, 8 Drawing Sheets

(56) References Cited

U.S. PATENT DOCUMENTS

2015/0180316 A1   6/2015  Maeshima

FOREIGN PATENT DOCUMENTS

| | | |
|---|---|---|
| JP | 2014-189166 A | 10/2014 |
| JP | 2015-134598 A | 7/2015 |

* cited by examiner

ELECTRIC MOTOR CONTROL APPARATUS

CROSS-REFERENCE TO RELATED APPLICATION

This application is based on Japanese Patent Application No. 2016-036595 filed with the Japan Patent Office on Feb. 29, 2016, the entire contents of which are incorporated herein by reference.

FIELD

The disclosure relates to a structure of an electric motor control apparatus that controls driving of an electric motor.

BACKGROUND

For example, an electric power steering system installed in a vehicle is provided with an electric motor control apparatus that controls driving of an electric motor. As disclosed in, for example, JP 2014-151850 A, JP 2013-106376 A, JP 2013-63689 A, JP 2015-134598 A, and JP 2014-189166 A, the electric motor control apparatus includes a driver circuit that drives the electric motor, a control circuit that controls the driver circuit, and an external connector for establishing electrical connection with an external apparatus.

In general, the driver circuit through which great current passes is implemented on a metal board or a metal-made cabinet, in consideration of heat dissipation, safety and the like. On the other hand, the control circuit through which great current does not pass is implemented on a printed circuit board (control board) or the like in consideration of high-density packaging and the like.

In JP 2014-151850 A, the driver circuit is implemented on one surface of the metal board. In order to dissipate heat from a heat-generating component included in the driver circuit and from the metal board, the metal board is fixed to a metal-made lid (cover) so that other surface of the metal board is in contact with the back surface of the lid. The printed circuit board equipped with the control circuit is fixed to the inside of a storage of the cabinet (case). By the lid being engaged with the cabinet so as to close the storage, the metal board and the printed circuit board are stored in the storage. In the storage, the metal board and the printed circuit board oppose to each other in parallel, and are electrically connected to each other by a connecting terminal. The electric motor is installed on the cabinet oppositely to the storage. On one surface of the printed circuit board not opposing to the metal board, a rotation sensor that detects rotation of a rotation shaft of the electric motor is mounted. The external connector is fixed to the cabinet on the side where the electric motor is installed. A plurality of terminals of the external connector project inside the storage of the cabinet and are electrically connected to the printed circuit board and the metal board.

In JP 2013-106376 A, the driver circuit is separately implemented on a first board and on a second board. The first board and the second board are electrically connected to each other by a connecting terminal retained by a relay member. The control circuit is implemented on a third board. On one surface of the third board which one surface does not oppose to the first board and the second board, a rotation sensor is mounted. The first board is fixed to the inside of a storage of a unit cover, so that one surface of the first board which one surface is not equipped with the driver circuit is in contact with the back surface of the unit cover. The second board is fixed inside the unit cover via the relay member and the first board. The third board is fixed to a plurality of pedestals provided inside the unit cover. By the unit cover engaging with the motor cover, the first to third boards and the relay member are stored inside the unit cover. The external connector is fixed to the outer surface of the unit cover, which outer surface is on the side opposite to the electric motor. A plurality of terminals of the external connector penetrate through the unit cover and are electrically connected to the second board or the third board.

In JP 2013-63689 A, the driver circuit is separately implemented on the metal board and on a second printed circuit board. The control circuit is implemented on a first printed circuit board. The metal board is fixed inside a storage of the cabinet (housing) so that one surface of the metal board which one surface is not equipped with components is in contact with the inner surface of the cabinet. The first printed circuit board is disposed on other surface side of the metal board. The second printed circuit board is disposed oppositely to the metal board with reference to the first printed circuit board. The metal board, the first printed circuit board, and the second printed circuit board are electrically connected to one another by a connecting terminal. By the cabinet and the lid engaging with each other so as to close the storage of the cabinet, the metal board, the first printed circuit board, the second printed circuit board and the connecting terminal are stored inside the storage. The electric motor is installed on the cabinet oppositely to the lid. The external connector is projectively and integrally provided at the outer surface of the lid, which outer surface is on the side opposite to the cabinet. A plurality of terminals of the external connector penetrate through the lid and are electrically connected to the first printed circuit board or the metal board.

In JP 2015-134598 A, the driver circuit is implemented on the control board as a module. The module is thermally in contact with a heat sink via a heat conductive member. The control board is fixed to a motor cover such that one surface of the control board which one surface is on the side opposite to the module is in contact with the upper surface of the motor cover. The motor cover stores the electric motor. By the heat sink being held between the motor cover and a connector case, the control board and the module are stored between the motor cover and the heat sink. Between the heat sink and the connector case, a capacitor and a noise filter module are stored. The external connector is projectively and integrally provided at the outer surface of the connector case which outer surface is on the side opposite to the motor cover. A plurality of terminals of the external connector penetrate through the cover and the heat sink and are electrically connected to the control board.

In JP 2014-189166 A, the driver circuit is implemented on a first board. The control circuit is implemented on a second board. The first board is disposed on the inner side of a relay member, and fixed to the inner surface of a unit cover together with the relay member. One surface of the first board where the driver circuit is not implemented is in contact with the inner surface of the unit cover. The second board is fixed to the relay member on the side opposite to the unit cover. A rotation sensor is mounted on a surface of the second board not opposing to the first board. The first board and the second board are electrically connected to each other by a connecting terminal. By the unit cover engaging with the motor cover, the first board, the second board, and the relay member are stored inside the unit cover. At the circumferential surface of the relay member, the external connector is projectively and integrally provided. The external connector laterally projects relative to the motor cover and the unit cover. A plurality of terminals of the external connector penetrate through the relay member and are electrically connected to the first board or the second board.

In connection with the electric motor control apparatus, implementing the driver circuit dispersedly on a multitude of members such as boards, a heat sink and the like increases the number of components. This disadvantageously increases the number of processes in assembling, and increases the size of the electric motor control apparatus in the direction in which the boards and the heat sink are arranged. Further, as in JP 2014-151850 A, when the mating part of the external connector projects to the side where the electric motor is provided, the external connector must be disposed laterally relative to the electric motor with a distance, so that connecting the harness to the mating part is not hindered by the electric motor. However, such a disposition laterally increases the size of the electric motor control apparatus. Further, the board must be increased in size for connecting the terminals of the external connector. This also laterally increases the size of the electric motor control apparatus.

Further, assembling the electric motor control apparatus includes: connecting the external connector and the connecting terminal to the boards; fixing the boards and the external connector to the cabinet and the lid; and combining the cabinet with the lid. Performing these operations without visual monitoring will result in poor assembling work efficiency and erroneous assembling. That is, assemblability disadvantageously reduces.

SUMMARY

An object of the disclosure is to provide an electric motor control apparatus achieving miniaturization and assemblability improvements.

An electric motor control apparatus according to one or more embodiments of the disclosure includes: a metal board equipped with a driver circuit configured to drive an electric motor a control board opposing to the metal board in parallel, and equipped with a control circuit configured to control the driver circuit; a board connecting terminal configured to electrically connect the metal board and the control board to each other; an external connector configured to electrically connect an external apparatus to one of the metal board and the control board; a rotation sensor mounted on the control board and configured to detect rotation of a rotation shaft of the electric motor; a cabinet that has, on its one side, a storage configured to store the metal board, the control board, and the board connecting terminal, the cabinet having the electric motor installed on its other side; and a lid configured to be engaged with the cabinet so as to close the storage. The lid has: a fixing surface to which the metal board is fixed so that a metal surface of the metal board is in contact with the fixing surface; a through bore which is provided in laterally close proximity to the fixing surface, and from which a mating part of the external connector is exposed, a harness connected to the external apparatus being mated with the mating part; a fixing edge which is an edge of the through bore on the storage side, and to which a housing of the external connector is fixed; and a plurality of fixing pedestals which project from a circumference of the fixing surface, and to which the control board is fixed. The external connector has: a first terminal configured to be electrically connected to the metal board; and a second terminal configured to be electrically connected to the control board. A direction of connecting the first terminal of the external connector to the metal board fixed to the fixing surface of the lid is one direction being perpendicular to the metal board. A direction of connecting the control board to the second terminal of the external connector fixed to the fixing edge of the lid is identical to the direction of connecting the first terminal to the metal board.

Based on the foregoing, the driver circuit and the control circuit of the electric motor are respectively implemented on the metal board and the control board. In assembling, on one side of the lid, which one side opposes to the storage of the cabinet, firstly, the metal board may be fixed to the fixing surface so that the metal surface is in contact with the fixing surface of the lid. Next, the housing of the external connector may be fixed to the fixing edge with the mating part of the external connector exposed at the through bore provided in laterally close proximity to the fixing surface, and the first terminal of the external connector may be connected to the metal board in one direction being perpendicular to the metal board. Next, in the identical one direction, the control board may be fixed to the fixing pedestals of the lid, and the control board may be connected to the second terminal of the external connector. Finally, by the lid engaging with the cabinet so as to close the storage while having the control board and the metal board fitted into the storage, the control board, the metal board and the like can be stored in the storage. That is, the metal board, the external connector, and the control board can be fixed to the lid in order and in an identical direction while being visually monitored, and thereafter the lid and the cabinet can be combined with each other while being visually monitored. This avoids poor work efficiency or erroneous assembling, and improves assemblability. Further, with a smaller number of components by virtue of the two boards being equipped with the driver circuit, the control circuit, and the rotation sensor, the electric motor control apparatus can be assembled in a smaller number of processes.

Further, the external connector is disposed in laterally close proximity to the metal board, and the mating part of the external connector is exposed oppositely to the electric motor. Accordingly, as compared to the case where the mating part of the external connector is exposed on the electric motor side, the external connector can be positioned toward the electric motor and the center of the electric motor control apparatus. This contributes to reducing the area of the metal board and that of the control board, thereby miniaturizing the electric motor control apparatus in the direction parallel to the board surfaces. Further, since the driver circuit, the control circuit, and the rotation sensor are mounted on the two boards, the electric motor control apparatus can be miniaturized also in the arrangement direction of the boards.

In one or more embodiments of the disclosure, in the electric motor control apparatus, the mating part of the external connector may project, from the through bore of the lid, oppositely to the fixing pedestals. The direction of mating the harness with the mating part may be a reverse of the direction of connecting the first terminal to the metal board and the direction of connecting the control board to the second terminal.

In one or more embodiments of the disclosure, in the electric motor control apparatus, the driver circuit and one end of the board connecting terminal may be mounted on one surface of the metal board, the one surface opposing to the control board. A direction of connecting the control board to other end of the board connecting terminal may be identical to the direction of connecting the control board to the second terminal of the external connector.

In one or more embodiments of the disclosure, in the electric motor control apparatus, the lid may be made of metal. A thickness of a region in the lid where the fixing surface is provided may be greater, oppositely to the fixing pedestals, than a thickness of other region in the lid.

In one or more embodiments of the disclosure, in the electric motor control apparatus, the external connector may further have a component mounting part on which an electronic component being greater in height than an electronic component mounted on one of the metal board and the control board is mounted from the mating part side. The lid may further have a fit-in part into which the electronic component mounted on the component mounting part is fitted. The fit-in part may project, oppositely to the fixing pedestals, greater than other part of the lid.

In one or more embodiments of the disclosure, in the electric motor control apparatus, the mating part of the external connector may be spaced apart from the fit-in part, and project, oppositely to the fixing pedestals, greater than the fit-in part.

The disclosure provides an electric motor control apparatus achieving miniaturization and assemblability improvements.

DETAILED DESCRIPTION

Figure 1:
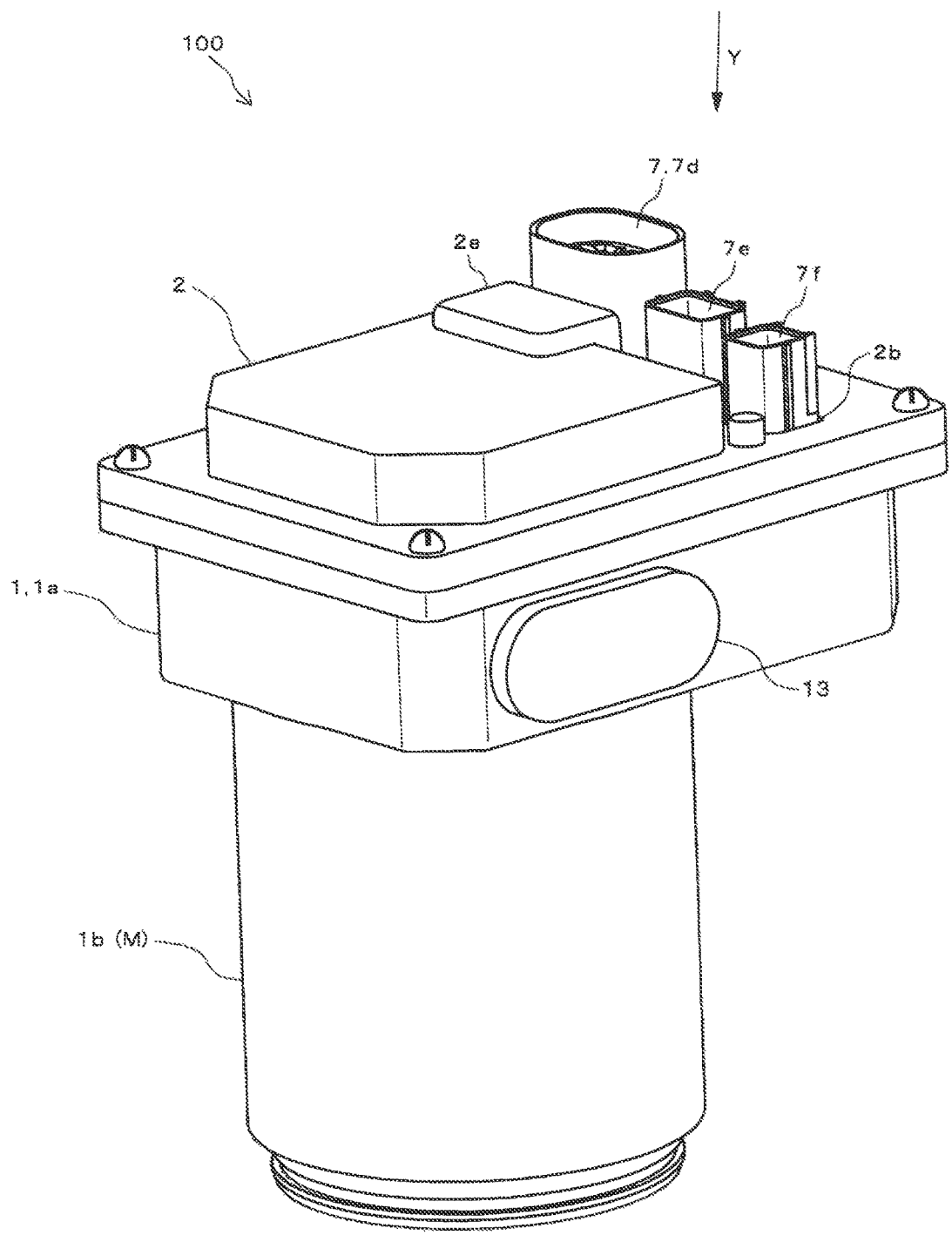
FIG. 1 is a perspective view of an electric motor control apparatus according to one or more embodiments of the disclosure.

Embodiments of the disclosure will be described with reference to the drawings. In the drawings, the identical or equivalent component is designated by the identical numeral. In embodiments of the disclosure, numerous specific details are set forth in order to provide a more through understanding of the invention. However, it will be apparent to one of ordinary skill in the art that the invention may be practiced without these specific details. In other instances, well-known features have not been described in detail to avoid obscuring the invention. Hereinbelow, an example in which the disclosure is applied to an electric car will be described.

Firstly, with reference to FIGS. 1 to 5, a description will be given of the structure of an electric motor control apparatus 100 according to one or more embodiments of the disclosure.

Figure 2:
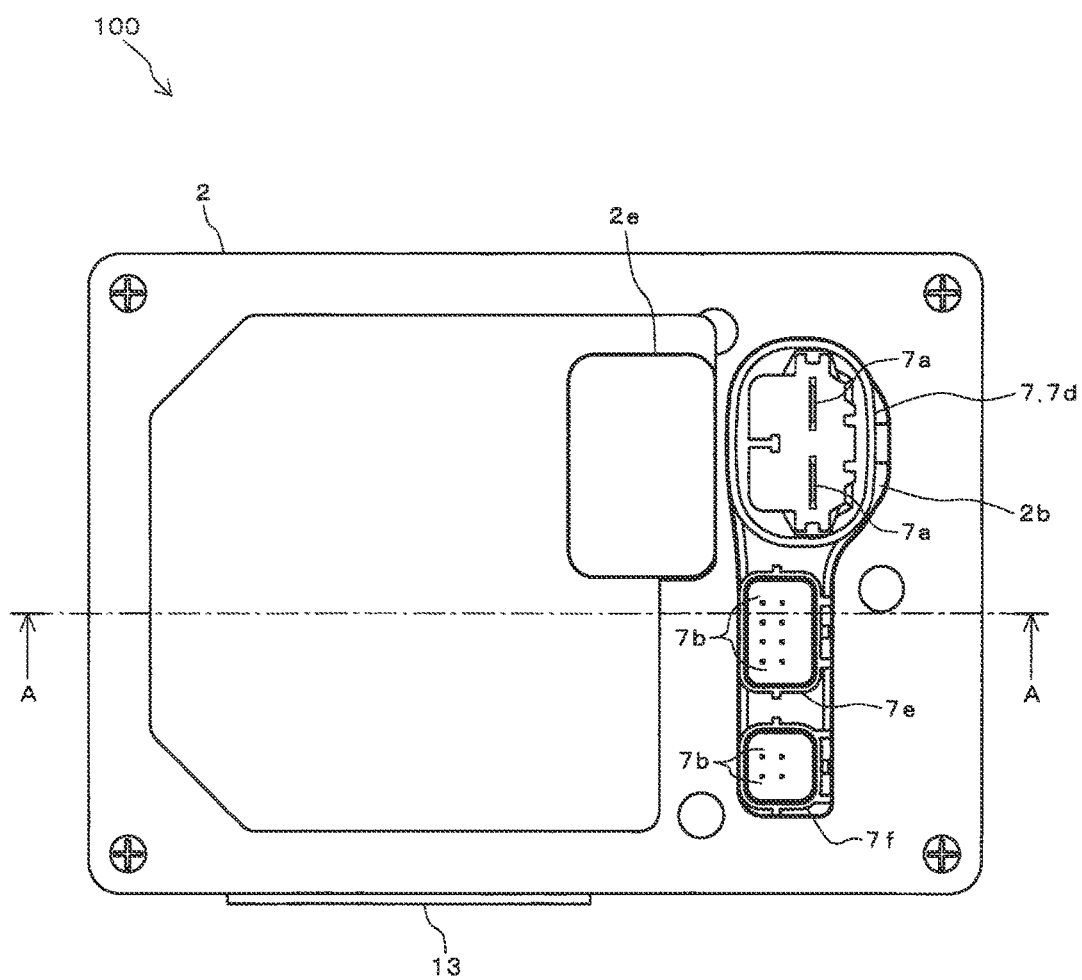
FIG. 2 is a plan view of the electric motor control apparatus shown in FIG. 1.
Figure 3:
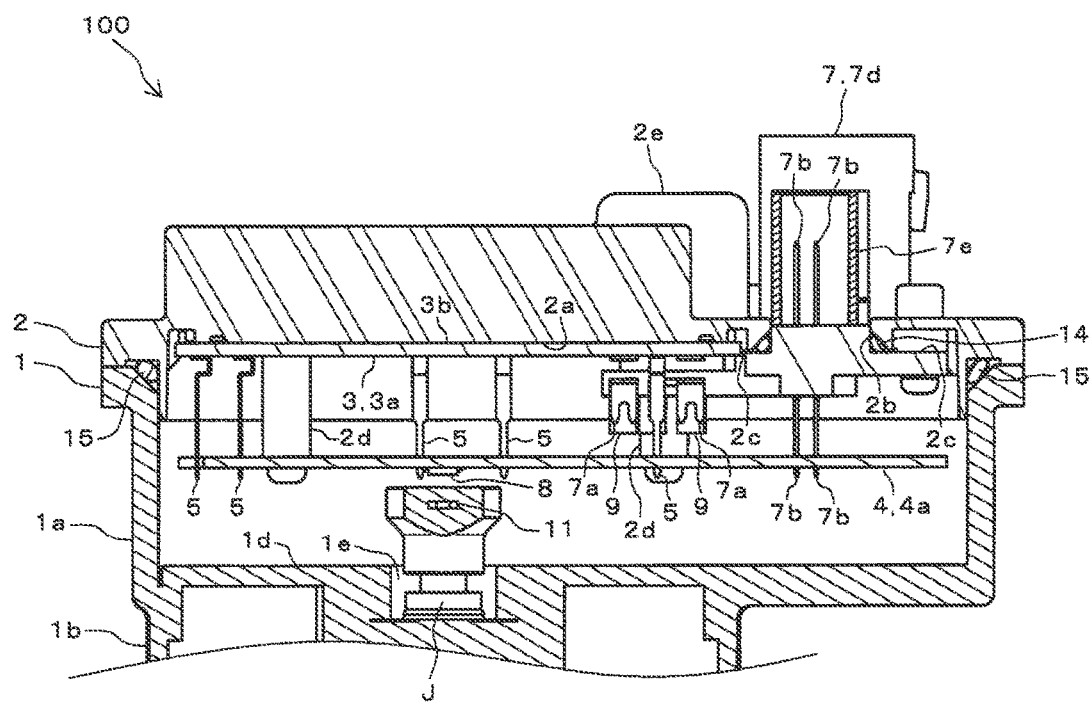
FIG. 3 is a cross-sectional view taken along line A-A in FIG. 2.
Figure 4:
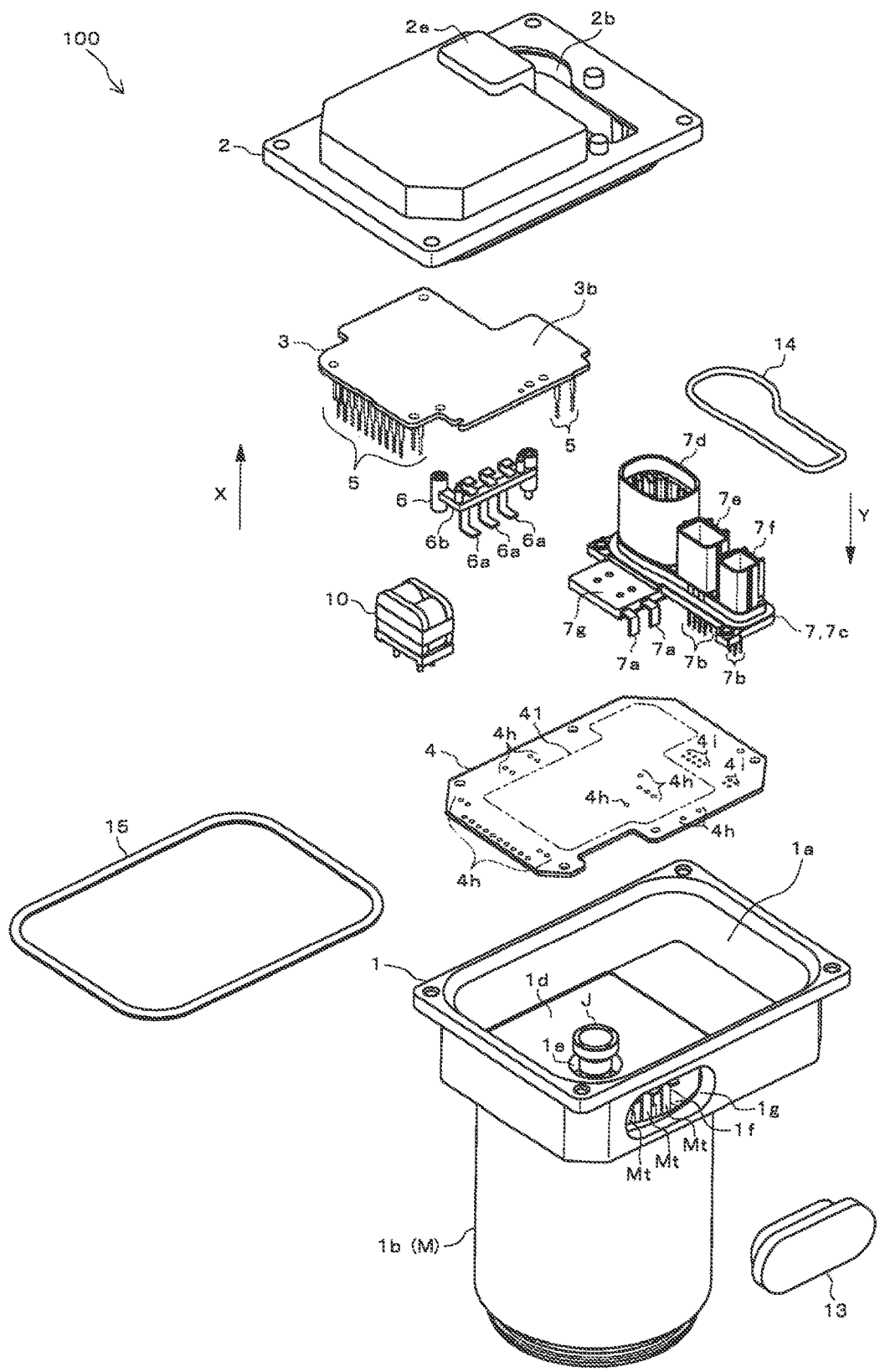
FIG. 4 is an exploded perspective view of the electric motor control apparatus shown in FIG. 1.
Figure 5:
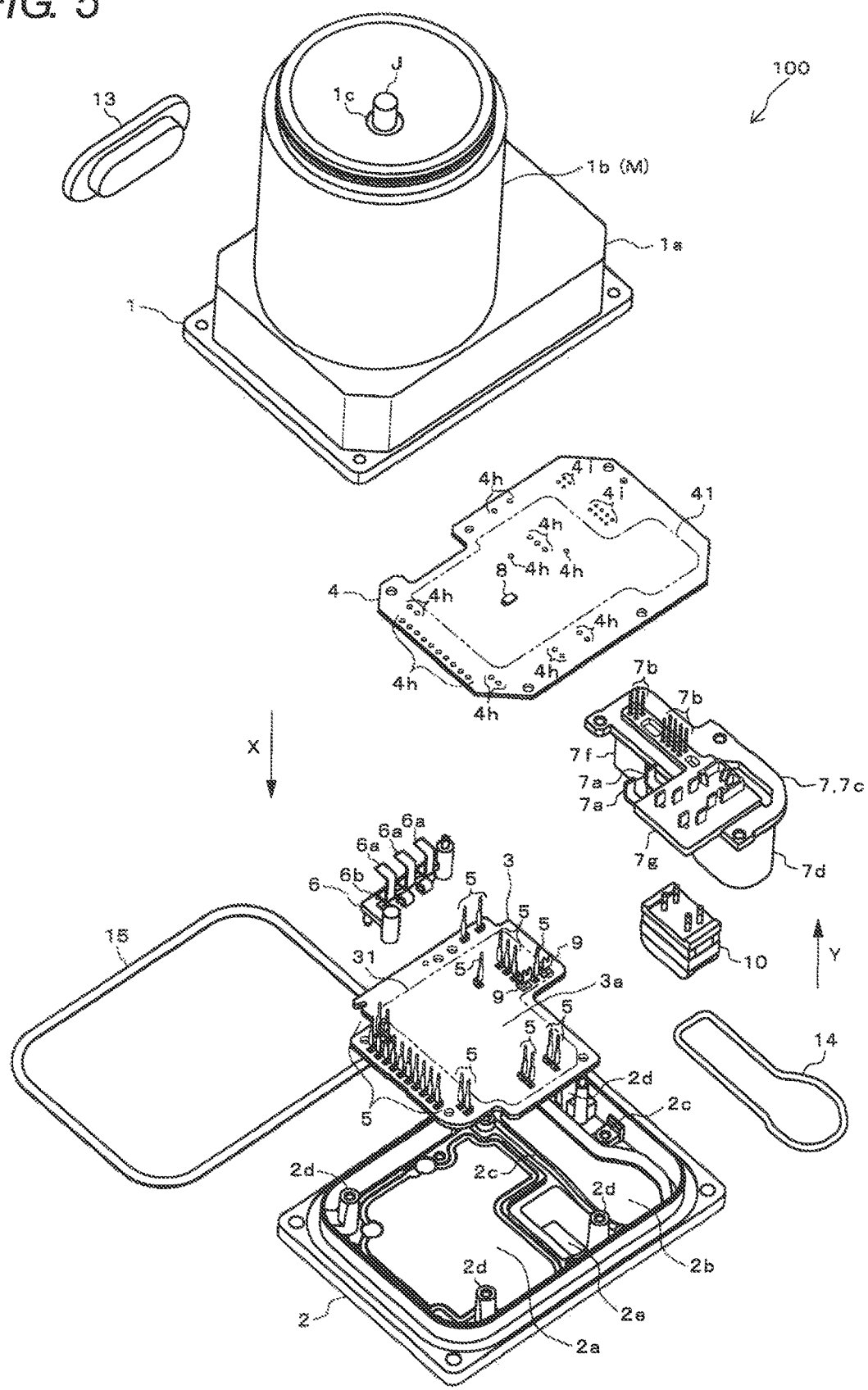
FIG. 5 is an exploded perspective view of the electric motor control apparatus shown in FIG. 1.

FIG. 1 is a perspective view of the electric motor control apparatus 100. FIG. 2 is a plan view of the electric motor control apparatus 100. FIG. 3 is a cross-sectional view taken along line A-A in FIG. 2. FIGS. 4 and 5 are each an exploded perspective view of the electric motor control apparatus 100. Specifically, FIG. 4 is an exploded perspective view of the electric motor control apparatus 100 as seen from the lid 2 side, while FIG. 5 is an exploded perspective view of the electric motor control apparatus 100 as seen from the cabinet 1 side.

The electric motor control apparatus 100 is installed in an electric power steering system of a vehicle, and controls driving of an electric motor for assisting in steering the vehicle.

As shown in FIGS. 4 and 5, the electric motor control apparatus 100 includes a cabinet 1, a lid 2, a metal board 3, a control board 4, board connecting terminals 5, a motor connecting member 6, an external connector 7, a rotation sensor 8 (FIG. 5) and others.

The cabinet 1 is made of metal. As shown in FIG. 4, the cabinet 1 has a quadrangular box-shaped storage 1a on one side (the upper side in FIG. 4), and has a cylinder 1b on other side (the bottom side in FIG. 4). The storage 1a stores the metal board 3, the control board 4, the board connecting terminals 5 and the like. In the cylinder 1b, an electric motor M is installed (details of the electric motor M are not shown).

At an end of the cylinder 1b of the cabinet 1, a through bore 1c is formed. At a partition 1d partitioning between the cylinder 1b and the storage 1a, through bores 1e, 1f are formed (FIGS. 3 and 4). As shown in FIG. 5, one end of a rotation shaft J of the electric motor M projects to the outside through the through bore 1c. As shown in FIGS. 3 and 4, other end of the rotation shaft J projects into the storage 1a through the through bore 1e. Three motor terminals Mt project into the storage 1a through the through bore 1f.

The lid 2 is made of metal. As shown in FIG. 2, the lid 2 is formed to be quadrangular as seen in a plan view. As shown in FIG. 3 and others, the lid 2 engages with the cabinet 1 so as to close the storage 1a.

The metal board 3 is a board made of metal such as aluminum. As shown in FIG. 5 and others, a driver circuit 31 that drives the electric motor M is implemented on one surface 3a of the metal board 3, which one surface 3a has undergone insulating processing. The driver circuit 31 includes components which generate heat upon energization, such as a switching element (details of which are not shown). Other surface 3b (FIG. 4) of the metal board 3 is a metal surface not having undergone insulating processing. No electronic components are mounted on the metal surface 3b (see FIGS. 3 and 4).

The control board 4 is formed by a printed circuit board and the like. A control circuit 41 is implemented on the control board 4 (FIGS. 4 and 5). The control circuit 41 includes a CPU, a memory and the like (details of which are not shown). The control board 4 controls the driver circuit 31 implemented on the metal board 3. Further, the control board 4 is greater than the metal board 3 in area.

The board connecting terminals 5 are formed by conductors, and provided by two or more in number for electrically connecting the metal board 3 and the control board 4. As shown in FIG. 5 and others, in addition to the driver circuit 31, the root of each of the board connecting terminals 5 is mounted on the one surface 3a of the metal board 3. The board connecting terminals 5 project perpendicularly from the metal board 3, and each have a sharp tip.

The control board 4 is provided with a plurality of through holes 4h for establishing connection with the tips of respective board connecting terminals 5. The tips of respective board connecting terminals 5 are fitted into corresponding through holes 4h of the control board 4. An electrically conductive portion around each through hole 4h and the tip of each board connecting terminal 5 are joined to each other with metal such as solder or copper. Thus, the driver circuit 31 at the metal board 3 and the control circuit 41 at the control board 4 are electrically connected to each other via the board connecting terminals 5. In this connected state, as shown in FIG. 3, the metal board 3 and the control board 4 oppose to each other in parallel.

As shown in FIGS. 4 and 5, the motor connecting member 6 is structured by three terminals 6a and a base 6b that retains the terminals 6a. The terminals 6a are formed by conductors, and the base 6b is made of synthetic resin. The motor connecting member 6 is mounted on the one surface 3a of the metal board 3 (see FIG. 6, which will be described later). In more detail, the motor connecting member 6 is placed on the one surface 3a of the metal board 3, and the root of each of the terminals 6a is joined to the metal board 3 through welding. The tips of respective terminals 6a are joined to corresponding motor terminals Mt (FIG. 4) through welding. Thus, the driver circuit 31 at the metal board 3 and the electric motor M are electrically connected to each other.

The external connector 7 is structured by a plurality of power supply terminals 7a, a plurality of signal terminals 7b, and a housing 7c that retains the power supply terminals 7a and the signal terminals 7b. The power supply terminals 7a and the signal terminals 7b are formed by conductors, and the housing 7c is made of synthetic resin.

As shown in FIGS. 1, 2, and 5, three mating parts 7d, 7e, 7f are projectively formed at the external connector 7. Inside the mating part 7d, one ends of respective power supply terminals 7a project (FIG. 2). Other ends of respective power supply terminals 7a project from the housing 7c oppositely to the mating part 7d (FIGS. 4 and 5). Inside other mating parts 7e, 7f, one ends of the signal terminals 7b project, respectively (FIG. 2). Other ends of respective signal terminals 7b project from the housing 7c oppositely to the mating parts 7e, 7f, respectively (FIGS. 4 and 5).

Other ends of respective power supply terminals 7a are electrically connected to connecting terminals 9 mounted on the one surface 3a of the metal board 3 (FIG. 3) through welding. Thus, the external connector 7 and the metal board 3 are electrically connected to each other. Other ends of respective signal terminals 7b are fitted into through holes 4i (FIGS. 4 and 5) formed at the control board 4 and connected with metal such as solder or copper. Thus, the external connector 7 and the control board 4 are electrically connected to each other. The power supply terminals 7a are one example of "a first terminal" in one or more embodiments of the disclosure, and the signal terminals 7b are one example of "a second terminal" in one or more embodiments of the disclosure.

With the mating parts 7d, 7e, 7f of the external connector 7, harnesses connected to not-shown external apparatuses are mated, respectively. Thus, the driver circuit 31 at the metal board 3 and the control circuit 41 at the control board 4 are electrically connected to the external apparatuses via the external connector 7.

The external apparatuses include a battery mounted on the vehicle and a vehicle electronic control unit (ECU). The battery supplies to the driver circuit 31 at the metal board 3 with drive current for driving the electric motor M, via the harness, the power supply terminals 7a of the external connector 7, and the connecting terminals 9. The vehicle ECU supplies various kinds of signals to the control circuit 41 at the control board 4, via the harness and the signal terminals 7b of the external connector 7.

As shown in FIG. 4, the external connector 7 is provided with a component mounting part 7g for mounting a filter component 10 on the side where the mating parts 7d to 7f are provided. The filter component 10 is formed by electronic components such as a coil and a capacitor, which are greater in height than the electronic components mounted on the metal board 3 and the control board 4. Mounting the filter component 10 on the component mounting part 7g electrically connects the filter component 10 and the power supply terminals 7a to each other. The filter component 10 removes noises on current supplied from the battery to the driver circuit 31.

The rotation sensor 8 (FIGS. 3 and 5) is formed by a magnetic sensor. The rotation sensor 8 is mounted on a surface 4a of the control board 4, which surface 4a does not oppose to the metal board 3 (that is, the surface opposing to the electric motor M). As shown in FIG. 3, in the storage 1a of the cabinet 1, the rotation sensor 8 opposes to other end of the rotation shaft J of the electric motor M while being spaced apart therefrom by a predetermined distance. A magnet 11 is embedded in the other end of the rotation shaft J. The rotation sensor 8 detects rotation of the rotation shaft J based on changes in the magnetic field of the magnet 11.

The metal board 3, the control board 4, and the external connector 7 are fixed to the back surface side of the lid 2 (the side opposing to the storage 1a of the cabinet 1). Accordingly, as shown in FIG. 5, on the back surface side of the lid 2, a fixing surface 2a, a fixing edge 2c, and fixing pedestals 2d are provided. Further, the lid 2 is provided with a through bore 2b and a fit-in part 2e.

As shown in FIG. 3, the metal board 3 is fixed to the fixing surface 2a with screws or the like, so that metal surface 3b of the metal board 3 is in contact with the fixing surface 2a of the lid 2. The thickness of the region in the lid 2 where the fixing surface 2a is provided (the thickness in the direction perpendicular to the fixing surface 2a) is greater, oppositely to the fixing pedestals 2d, than the thickness of the other region.

As shown in FIGS. 3 and 5, the through bore 2b is provided in laterally close proximity to the fixing surface 2a of the lid 2. As shown in FIG. 3, the external connector 7 penetrates through the through bore 2b from the back side of the lid 2 (the side opposing to the storage 1a) to the front side thereof (the exterior side). The mating parts 7d, 7e, 7f of the external connector 7 are exposed at the through bore 2b. The housing 7c of the external connector 7 is fixed to the fixing edge 2c, which is the edge of the through bore 2b on the storage 1a side, with screws or the like.

As shown in FIG. 5, the fit-in part 2e is provided between the fixing surface 2a and the fixing edge 2c of the lid 2. The fit-in part 2e is recessed to open on the back surface side of the lid 2. Further, as shown in FIGS. 1, 3, and 4, the fit-in part 2e projects, oppositely to the fixing pedestals 2d, greater than other portion of the lid 2.

As shown in FIGS. 2 and 3, the mating parts 7d, 7e, 7f of the external connector 7 are spaced apart from the fit-in part 2e, and project, oppositely to the fixing pedestals 2d, greater than the fit-in part 2e.

As shown in FIG. 5, around the fixing surface 2a of the lid 2, a plurality of fixing pedestals 2d are projectively provided. As shown in FIG. 3, the control board 4 is fixed onto the fixing pedestals 2d with screws or the like.

Next, with reference to FIGS. 1 to 8, a description will be given of the procedure of assembling the electric motor control apparatus 100.

Figure 6:
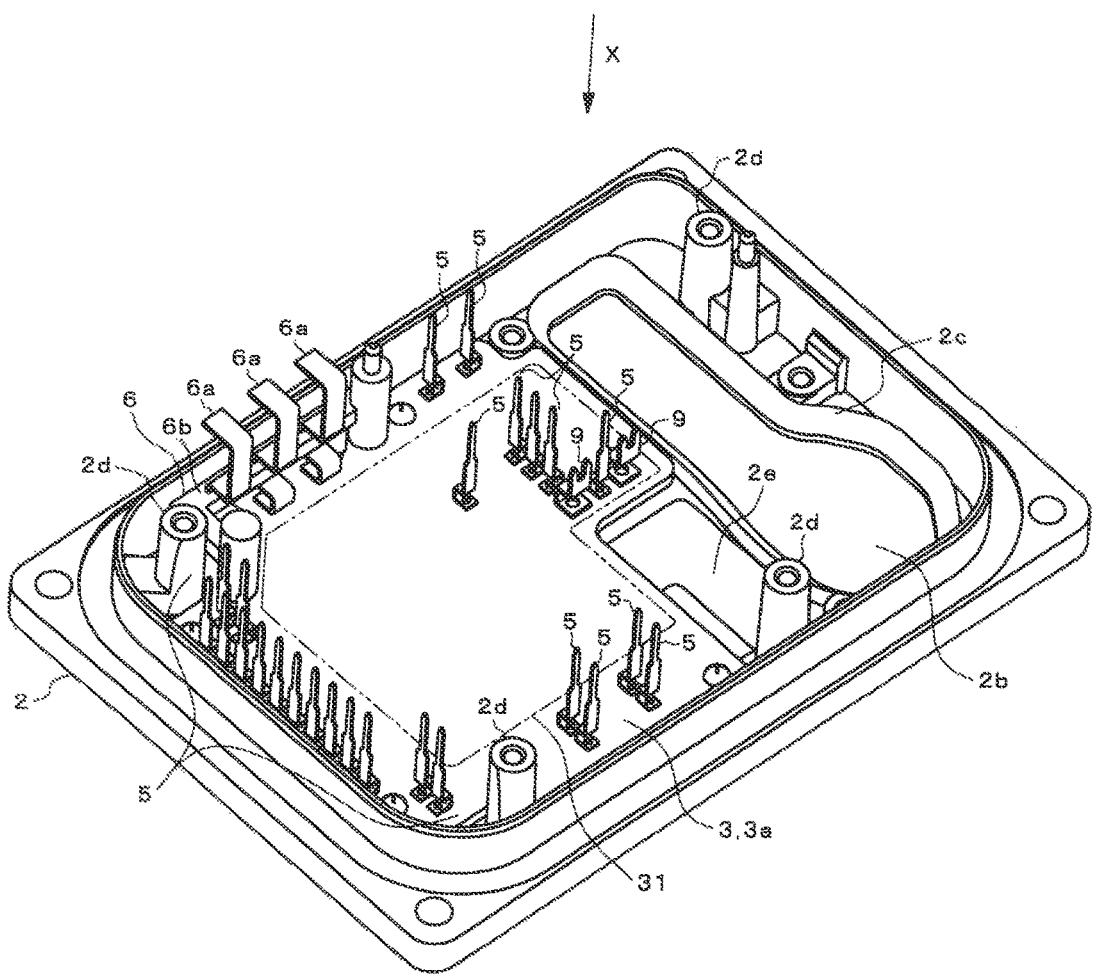
FIG. 6 is a perspective view showing one process of assembling the electric motor control apparatus shown in FIG. 1.
Figure 7:
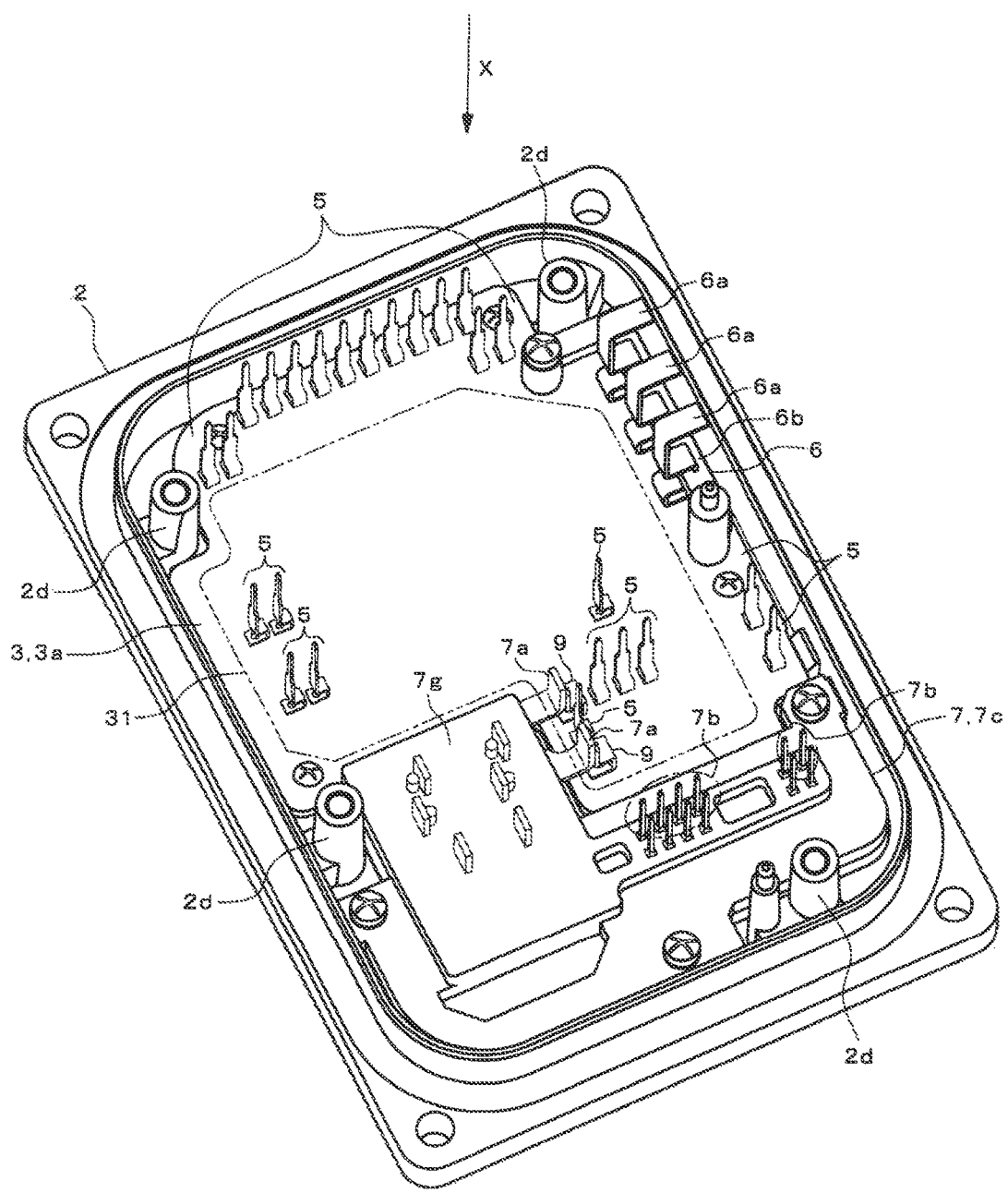
FIG. 7 is a perspective view showing one process of assembling the electric motor control apparatus shown in FIG. 1.
Figure 8:
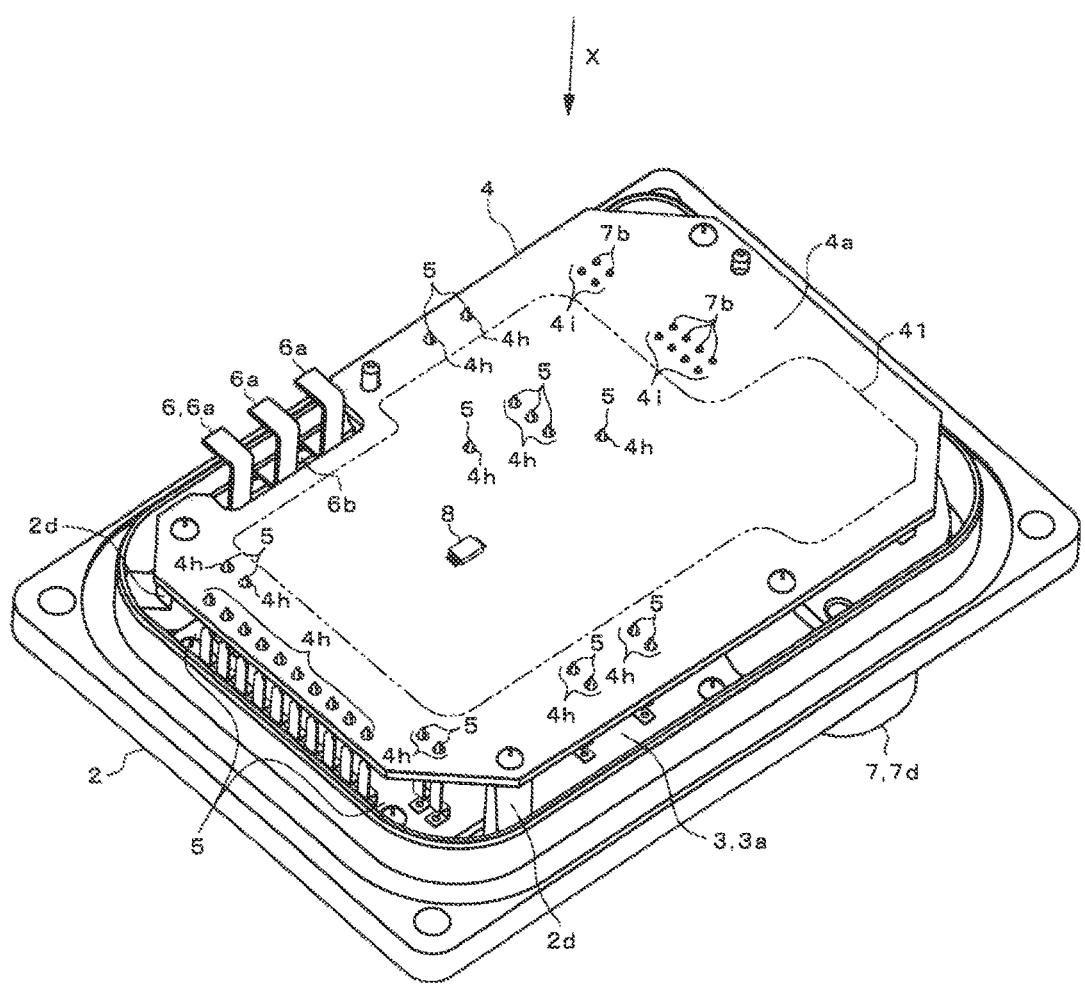
FIG. 8 is a perspective view showing one process of assembling the electric motor control apparatus shown in FIG. 1.

FIGS. 6 to 8 are each a perspective view showing one process of assembling the electric motor control apparatus 100.

The driver circuit 31, the board connecting terminal 5, the motor connecting member 6, and the connecting terminals 9 are previously mounted on the metal board 3. Further, the control circuit 41 and the rotation sensor 8 are previously mounted on the control board 4. Still further, the filter component 10 is previously mounted on the component mounting part 7g of the external connector 7. Still further, the electric motor M is previously installed in the cylinder 1b of the cabinet 1.

Then, firstly, the metal board 3 is fixed to the fixing surface 2a with screws or the like (FIG. 6), so that the metal surface 3b (FIG. 4) of the metal board 3 is in contact with the fixing surface 2a (FIG. 5) of the lid 2. Here, a sheet member (not shown) being electrically insulating and thermally conductive may be interposed between the fixing surface 2a and the metal surface 3b.

Next, other ends of the power supply terminals 7a projecting oppositely to the mating parts 7d to 7f are engaged with the connecting terminals 9 on the metal board 3 in one direction X (FIGS. 4 and 5) being perpendicular to the metal board 3, with the mating parts 7d to 7f of the external connector 7 projected from the through bore 2b and with the filter component 10 fitted into the fit-in part 2e. Then, the housing 7c of the external connector 7 is fixed to the fixing edge 2c with screws or the like, and the power supply terminals 7a and the connecting terminals 9 are electrically connected to each other through welding or the like (FIG. 7). A sealing member 14 (FIGS. 4 and 5) is interposed between the housing 7c and the fixing edge 2c.

Next, the control board 4 is placed on the fixing pedestals 2d (FIG. 8), while having the tip portions of the board connecting terminals 5 on the metal board 3 fitted into the through holes 4h at the control board 4 and having other ends of the signal terminals 7b of the external connector 7 fitted into the through holes 4i at the control board 4. Here, the surface 4a of the control board 4 where the rotation sensor 8 is mounted is oriented oppositely to the metal board 3. Further, the through holes 4h, 4i at the control board 4 are engaged, in one direction X, with the board connecting terminals 5 on the metal board 3 and the signal terminals 7b of the external connector 7. Then, the control board 4 are fixed to the fixing pedestals 2d with screws or the like. The tips of the board connecting terminals 5 are connected to the through holes 4h with solder or the like. Other ends of the signal terminals 7b are connected to the through holes 4i with solder or the like.

Next, as shown in FIG. 3, the lid 2 is engaged with the cabinet 1 so as to close the storage 1a, while having the metal board 3, the control board 4, the connecting terminals 5, 9, and the portions of the external connector 7 on the side opposite to the side where the mating parts 7d to 7f are provided fitted into the storage 1a of the cabinet 1. Then, the four corners of the lid 2 and those of the cabinet 1 are fixed to each other with screws or the like. Here, a sealing member 15 (FIGS. 4 and 5) is interposed between the lid 2 and the cabinet 1.

Finally, a not-shown welding tool is inserted from a window 1g (FIG. 4) provided at the sidewall of the storage 1a of the cabinet 1, to connect the motor terminals Mt projecting from the through bore 1f into the storage 1a and the terminals 6a of the motor connecting member 6 mounted on the metal board 3 to each other through welding. Thereafter, a cover 13 is fixed to the cabinet 1 with screws or the like so as to close the window 1g (FIG. 1). Here, a sealing member may be interposed between the cover 13 and the cabinet 1.

The electric motor control apparatus 100 assembled in the foregoing manner is installed in a vehicle, and thereafter electrically connected to external apparatuses such as a battery, a vehicle ECU and the like via harnesses. Here, the harnesses connected to the external apparatuses are mated, in Y direction (FIGS. 4 and 5), with the mating parts 7d to 7f of the external connector 7 projecting from the lid 2. This direction Y in which the harnesses are mated with the mating parts 7d to 7f is opposite to direction X in which the metal board 3, the control board 4, and the external connector 7 are attached to the lid 2.

In an illustrative embodiment, the driver circuit 31 and the control circuit 41 of the electric motor M are respectively implemented on the metal board 3 and the control board 4. In assembling, on one side (on the back surface side) of the lid 2 opposing to the storage 1a of the cabinet 1, firstly, the metal board 3 may be fixed to the fixing surface 2a, so that the metal surface 3b is in contact with the fixing surface 2a of the lid 2. Next, the housing 7c of the external connector 7 may be fixed to the fixing edge 2c with the mating parts 7d to 7f of the external connector 7 exposed at the through bore 2b positioned in laterally close proximity to the fixing surface 2a, and the power supply terminals 7a of the external connector 7 may be connected to the connecting terminals 9 on the metal board 3 in one direction X being perpendicular to the metal board 3. Next, in the identical one direction X, the control board 4 may be fixed to the fixing pedestals 2d of the lid 2, and the through holes 4i of the control board 4 may be connected to the signal terminals 7b of the external connector 7. Finally, by the lid 2 engaging with the cabinet 1 so as to close the storage 1a while having the control board 4, the metal board 3 and the like fitted into the storage 1a, the control board 4, the metal board 3 and the like can be stored in the storage 1a. That is, the metal board 3, the external connector 7, and the control board 4 can be fixed to the lid 2 in order and in the identical direction X while visually monitored, and thereafter the lid 2 and the cabinet 1 can be combined with each other while being visually monitored. This avoids poor work efficiency or erroneous assembling, and improves assemblability. Further, with a smaller number of components by virtue of the two boards 3, 4 being equipped with the driver circuit 31, the control circuit 41, and the rotation sensor 8, the electric motor control apparatus 100 can be assembled in a smaller number of processes.

Further, the external connector 7 is disposed in laterally close proximity to the metal board 3, and the mating parts 7d to 7f of the external connector 7 are exposed oppositely to the electric motor M. Accordingly, as compared to the technique disclosed in JP 2014-151850 A in which the mating parts of the external connector are exposed on the electric motor side, the external connector 7 can be positioned toward the electric motor M and the center of the electric motor control apparatus 100. This contributes to reducing the area of the metal board 3 and that of the control board 4, thereby miniaturizing the electric motor control apparatus 100 in the direction parallel to the board surfaces (in the horizontal direction). Further, since the driver circuit 31, the control circuit 41, and the rotation sensor 8 are mounted on the two boards 3, 4, the electric motor control apparatus 100 can be miniaturized also in the arrangement direction of the boards 3, 4 (in the vertical direction).

Further, in an illustrative embodiment, the mating parts 7d to 7f of the external connector 7 project from the through bore 2b of the lid 2 oppositely to the t electric motor M. Direction Y of mating the harnesses with the mating parts 7d to 7f is a reverse of direction X of connecting the power supply terminals 7a of the external connector 7 to the metal board 3 and direction X of connecting the control board 4 to the signal terminals 7b of the external connector 7. Accordingly, the external connector 7 can be positioned toward the center of the electric motor control apparatus 100, contributing to reducing the area of the metal board 3 and that of the control board 4, thereby achieving further miniaturization of the electric motor control apparatus 100. Further, in mating or removing the harnesses with or from the mating parts 7d to 7f of the external connector 7, the mating or removal work can be easily performed without being hindered by the electric motor M.

Still further, in an illustrative embodiment, direction X of connecting the control board 4 to the board connecting terminals 5 mounted on the one surface 3a of the metal board 3 is identical to direction X of connecting the control board 4 to the signal terminals 7b of the external connector 7. Accordingly, by the control board 4 being brought closer, in X direction, to the metal board 3 and the external connector 7 fixed to the lid 2, the control board 4 can be fixed to the fixing pedestals 2d of the lid 2, and the through holes 4h and 4i of the control board 4 can be connected to the board connecting terminals 5 mounted on the metal board 3 and to the signal terminals 7b of the external connector 7, respectively. That is, the control board 4 can be connected to the metal board 3 and to the external connector 7 in the identical direction X while visually monitored. Thus, assemblability further improves.

Still further, in an illustrative embodiment, the thickness of the region in the lid 2 where the fixing surface 2a is provided is greater, oppositely to the fixing pedestals 2d, than the thickness of the other region in the lid 2 (FIG. 3). Accordingly, the heat generated at the driver circuit 31 implemented on the metal board 3 can be efficiently dissipated by the metal-made lid 2.

Still further, in an illustrative embodiment, the filter component 10 being greater in height than the electronic components mounted on the metal board 3 and the control board 4 is mounted on the component mounting part 7g of the external connector 7 on the side where the mating parts 7d to 7f are provided. The fit-in part 2e into which the filter component 10 is fitted is provided at the lid 2, so as to project, oppositely to the fixing pedestals 2d, greater than other part of the lid 2. This eliminates the necessity of mounting the filter component 10 being greater in height on the metal board 3 or the control board 4. Accordingly, the distance between the metal board 3 and the control board 4 can be reduced, whereby the electric motor control apparatus 100 can be further miniaturized in the arrangement direction of the metal board 3 and the control board 4.

Still further, in an illustrative embodiment, the mating parts 7d to 7f of the external connector 7 are spaced apart from the fit-in part 2e of the lid 2, and project, oppositely to the fixing pedestals 2d, greater than the fit-in part 2e (FIGS. 2 and 3). Accordingly, without being hindered by the fit-in part 2e, the harnesses connected to the external apparatuses can be mated with the mating parts 7d to 7f of the external connector 7.

The disclosure can be carried out not only in an illustrative embodiment but also in other various embodiments. For example, while it has been shown in an illustrative embodiment that the part that stores the metal board 3 and the control board 4 and the part where the electric motor M is installed are integrally provided at the cabinet 1, the disclosure is not limited thereto. It is also possible to employ a cabinet in which the part storing the metal board and the control board and the part where the electric motor is installed are provided as separate members, and those parts are integrated by being fixed with screws or the like.

Still further, while it has been exemplarily shown in an illustrative embodiment that the storage 1a of the cabinet 1 is quadrangular box-shaped, the disclosure is not limited thereto. For example, the storage of the cabinet may be cylindrical or polygonal tubular. In this case, the metal board, the control board, and the external connector should be fabricated so as to conform to the shape of the storage.

Still further, while it has been exemplarily shown in an illustrative embodiment that the disclosure is applied to the electric motor control apparatus 100 used in the electric power steering system, the disclosure is also applicable to an electric motor control apparatus of other use.

While the invention has been described with reference to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. An electric motor control apparatus comprising:
   a metal board equipped with a driver circuit configured to drive an electric motor;
   a control board opposing to the metal board in parallel, and equipped with a control circuit configured to control the driver circuit;
   a board connecting terminal configured to electrically connect the metal board and the control board to each other;
   an external connector configured to electrically connect an external apparatus to one of the metal board and the control board;
   a rotation sensor mounted on the control board and configured to detect rotation of a rotation shaft of the electric motor;
   a cabinet that comprises, on its one side, a storage configured to store the metal board, the control board, and the board connecting terminal, the cabinet having the electric motor installed on its other side; and
   a lid configured to be engaged with the cabinet so as to close the storage,
   wherein the lid comprises:
      a fixing surface to which the metal board is fixed so that a metal surface of the metal board is in contact with the fixing surface;
      a through bore which is provided in laterally close proximity to the fixing surface, and from which a mating part of the external connector is exposed, a harness connected to the external apparatus being mated with the mating part;
      a fixing edge which is an edge of the through bore on the storage side, and to which a housing of the external connector is fixed; and
      a plurality of fixing pedestals which project from a circumference of the fixing surface, and to which the control board is fixed,
   wherein the external connector comprises:
      a first terminal configured to be electrically connected to the metal board; and a second terminal configured to be electrically connected to the control board, wherein a direction of connecting the first terminal of the external connector to the metal board fixed to the fixing surface of the lid is one direction being perpendicular to the metal board, and wherein a direction of connecting the control board to the second terminal of the external connector fixed to the fixing edge of the lid is identical to the direction of connecting the first terminal to the metal board.

2. The electric motor control apparatus according to claim 1, wherein the mating part of the external connector projects, from the through bore of the lid, oppositely to the fixing pedestals, and wherein a direction of mating the harness with the mating part is a reverse of the direction of connecting the first terminal to the metal board and the direction of connecting the control board to the second terminal.

3. The electric motor control apparatus according to claim 1, wherein the driver circuit and one end of the board connecting terminal are mounted on one surface of the metal board, the one surface opposing to the control board, and wherein a direction of connecting the control board to other end of the board connecting terminal is identical to the direction of connecting the control board to the second terminal of the external connector.

4. The electric motor control apparatus according to claim 1, wherein the lid is made of metal, and wherein a thickness of a region in the lid where the fixing surface is provided is greater, oppositely to the fixing pedestals, than a thickness of other region in the lid.

5. An electric motor control apparatus comprising:

a metal board equipped with a driver circuit configured to drive an electric motor;

a control board opposing to the metal board in parallel, and equipped with a control circuit configured to control the driver circuit;

a board connecting terminal configured to electrically connect the metal board and the control board to each other;

an external connector configured to electrically connect an external apparatus to one of the metal board and the control board;

a rotation sensor mounted on the control board and configured to detect rotation of a rotation shaft of the electric motor;

a cabinet that comprises, on its one side, a storage configured to store the metal board, the control board, and the board connecting terminal, the cabinet having the electric motor installed on its other side; and a lid configured to be engaged with the cabinet so as to close the storage, wherein the lid comprises:

a fixing surface to which the metal board is fixed so that a metal surface of the metal board is in contact with the fixing surface;

a through bore which is provided in laterally close proximity to the fixing surface, and from which a mating part of the external connector is exposed, a harness connected to the external apparatus being mated with the mating part;

a fixing edge which is an edge of the through bore on the storage side, and to which a housing of the external connector is fixed; and a plurality of fixing pedestals which project from a circumference of the fixing surface, and to which the control board is fixed, wherein the external connector comprises:

a first terminal configured to be electrically connected to the metal board; and a second terminal configured to be electrically connected to the control board, wherein a direction of connecting the first terminal of the external connector to the metal board fixed to the fixing surface of the lid is one direction being perpendicular to the metal board, wherein a direction of connecting the control board to the second terminal of the external connector fixed to the fixing edge of the lid is identical to the direction of connecting the first terminal to the metal board, wherein the external connector further comprises a component mounting part on which an electronic component being greater in height than an electronic component mounted on one of the metal board and the control board is mounted from a mating part side, wherein the lid further comprises a fit-in part into which the electronic component mounted on the component mounting part is fitted, and wherein the fit-in part projects, oppositely to the fixing pedestals, greater than other part of the lid.

6. The electric motor control apparatus according to claim 5, wherein the mating part of the external connector is spaced apart from the fit-in part, and projects, oppositely to the fixing pedestals, greater than the fit-in part.

* * * * *